(12) United States Patent
Jeon et al.

(10) Patent No.: US 12,722,549 B2
(45) Date of Patent: Sep. 1, 2026

(54) PASSENGER HEADREST HEIGHT ADJUSTMENT SYSTEM

(71) Applicant: GM Global Technology Operations LLC, Detroit, MI (US)

(72) Inventors: Minseok Jeon, Gimpo (KR); Kwangmin Park, Seoul (KR); Bongbum Back, Incheon (KR); Byungjin Min, Gyeonggi-do (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 98 days.

(21) Appl. No.: 18/911,795

(22) Filed: Oct. 10, 2024

(65) Prior Publication Data

US 2026/0103132 A1 Apr. 16, 2026

(51) Int. Cl.

| | |
|---|---|
| ***B60N 2/829*** | (2018.01) |
| ***B60N 2/00*** | (2006.01) |
| ***B60N 2/835*** | (2018.01) |

(52) U.S. Cl.
CPC ........... *B60N 2/829* (2018.02); *B60N 2/0025* (2023.08); *B60N 2/0034* (2023.08); *B60N 2/835* (2018.02)

(58) Field of Classification Search
CPC ...... B60N 2/0025; B60N 2/002; B60N 2/003; B60N 2/829; B60N 2/832; B60N 2/835; B60N 2/0034
See application file for complete search history.

(56) References Cited

U.S. PATENT DOCUMENTS

| | | | | |
|---|---|---|---|---|
| 4,222,608 A * | 9/1980 | Maeda | A47C 7/38 297/391 |
| 6,540,299 B1 * | 4/2003 | Gosk | B60N 2/067 297/410 |
| 11,180,063 B2 * | 11/2021 | Brown | B60N 2/206 |
| 11,180,102 B1 * | 11/2021 | Jaradi | B60R 21/2338 |
| 2006/0186713 A1 * | 8/2006 | Breed | B60N 2/829 297/216.12 |
| 2006/0217864 A1 * | 9/2006 | Johnson | B60N 2/1817 701/45 |
| 2007/0135982 A1 * | 6/2007 | Breed | E05F 15/43 701/36 |
| 2020/0062156 A1 * | 2/2020 | Little | B60N 2/02 |
| 2024/0308402 A1 * | 9/2024 | Amodeo | B60N 2/002 |
| 2024/0313579 A1 * | 9/2024 | Salter | B60N 2/5685 |

FOREIGN PATENT DOCUMENTS

| | | | |
|---|---|---|---|
| CN | 118953183 A | 11/2024 | |
| DE | 3925995 A1 * | 2/1991 | B60N 2/829 |
| DE | 20109257 U1 | 9/2001 | |

(Continued)

*Primary Examiner* — William L Miller
(74) *Attorney, Agent, or Firm* — Vivacqua Crane, PLLC

(57) ABSTRACT

A vehicle headrest height adjustment system includes a vehicle seat having a seat back, a seat base and a headrest. A sensing device generates a signal when the vehicle seat is unoccupied by an occupant. A headrest displacement mechanism is connected to the headrest and reversibly displaces the headrest between a headrest extended position and a headrest retracted position. The headrest displacement mechanism lowers the headrest to the headrest retracted position when the signal is received from the sensing device that the vehicle seat is unoccupied by the occupant defined when the occupant is not present.

11 Claims, 5 Drawing Sheets

(56) References Cited

FOREIGN PATENT DOCUMENTS

| | | | | | |
|---|---|---|---|---|---|
| DE | 102012214948 | A1 * | 2/2013 | ........... | B60N 2/0028 |
| DE | 102013221399 | A1 * | 4/2014 | ............. | B60N 2/859 |
| DE | 102019109814 | A1 | 10/2019 | | |
| DE | 102019123682 | A1 | 3/2021 | | |
| DE | 102022003549 | A1 | 4/2023 | | |
| DE | 102024121457 | A1 * | 12/2025 | ............. | B60N 2/885 |
| EP | 0972674 | A2 * | 1/2000 | ............. | B60N 2/829 |
| WO | WO-2013088264 | A1 * | 6/2013 | ........... | B60N 2/0244 |

* cited by examiner 10
12c
42
34
44
12a
38
24
26
16
20
14
18

12b
40
22
28
36
30
32

112
122

124
114
132
130
112
126
128

11
112
114
116
118
11
110
100
120

10
136
112
122
142
140

134
136
138
46
56
18
140

PASSENGER HEADREST HEIGHT ADJUSTMENT SYSTEM

INTRODUCTION

The present disclosure relates to vehicle seat headrests.

During vehicle driving, shoulder checking is a safety practice to ensure awareness of surrounding vehicles, especially during lane changes or maneuvers. Traditional vehicle passenger seat headrests may obstruct a driver's view to a second vehicle on a passenger seat side of a host vehicle during a shoulder check.

Thus, while current systems and methods to provide visibility during driver shoulder checking achieve their intended purpose, there is a need for a new and improved system and method to modify a height of a passenger seat headrest to improve driver visibility during a shoulder checking operation.

SUMMARY

According to several aspects, a vehicle headrest height adjustment system includes a vehicle seat having a seat back, a seat base and a headrest. A sensing device generates a signal when the vehicle seat is unoccupied of an occupant. A headrest displacement mechanism is connected to the headrest and reversibly displaces the headrest between a headrest extended position and a headrest retracted position. The headrest displacement mechanism lowers the headrest to the headrest retracted position when the signal is received from the sensing device that the vehicle seat is unoccupied of the occupant defined when the occupant is not present.

In another aspect of the present disclosure, the sensing device defines a weight sensor supported by the seat base.

In another aspect of the present disclosure, the weight sensor detects whether the occupant is on the vehicle seat, and the signal is sent as an initial weight sensor communication to a body control module (BCM). The BCM communicates with an electronic control unit (ECU) which provides motor control signals to a motor actuator of a motor. The motor actuator communicates with a support height sensor to sense an elevation of the headrest.

In another aspect of the present disclosure, the motor is operated automatically according to a value of the signal communicated to the BCM, and headrest lowering is determined depending on a presence or absence of the occupant through the BCM, and wherein the motor is operated manually via the ECU.

In another aspect of the present disclosure, the headrest displacement mechanism includes a motor positioned within a housing located within the seat back. At least one telescoping rod supports the headrest to the seat back and is connected to the motor thereby permitting telescoping motion of the headrest by operation of the motor.

In another aspect of the present disclosure, the headrest displacement mechanism includes: a threaded portion of the at least one telescoping rod; a shaft sleeve extending from the motor into the at least one telescoping rod; and a drive gear connected to the shaft sleeve engaging the threaded portion wherein operation of the motor rotates the drive gear and thereby the threaded portion initiates telescoping motion of the headrest.

In another aspect of the present disclosure, the sensing device defines a camera.

In another aspect of the present disclosure, the sensing device defines a seatbelt latched sensor indicating the occupant is not present due to an un-latched condition of a passenger seatbelt.

In another aspect of the present disclosure, a manual adjustment switch is positioned proximate to the occupant manually actuated by the occupant to change a position of the headrest.

In another aspect of the present disclosure, the headrest includes a concave portion which mimics and is oppositely facing with respect to portion of the seat back having a convex-shape.

According to several aspects, a headrest height adjustment system includes a vehicle seat having a seat base, a seat back rotatably connected to the seat back and a headrest telescoping from the seat back. A sensing device generates a signal if the vehicle seat is unoccupied. A first telescoping rod and a second telescoping rod are connected to the headrest allowing the headrest to slidably move between a headrest extended position and a headrest retracted position. A headrest displacement mechanism is connected to the headrest and one of the first telescoping rod and the second telescoping rod. The headrest displacement mechanism automatically lowers the headrest to the headrest retracted position when the signal is received from the sensing device that the vehicle seat is unoccupied by the occupant defined when the occupant is not present.

In another aspect of the present disclosure, the headrest displacement mechanism includes a motor, the motor being positioned in a housing which is fixed within the seat back.

In another aspect of the present disclosure, a shaft is connected to and is axially rotated by operation of the motor. The shaft extends into a tubular cavity of one of the first telescoping rod and the second telescoping rod. An inner wall of the one of the first telescoping rod and the second telescoping rod includes a threaded portion facing into the tubular cavity. A drive gear is fixed on the shaft and threadingly engages the threaded portion.

In another aspect of the present disclosure, the shaft passes through a shaft sleeve mounted to a surface of the seat back to retain a position and an orientation of the shaft while supporting axial rotation of the shaft.

In another aspect of the present disclosure, operation of the motor in a first operation rotates the shaft and thereby the drive gear which engages with the threaded portion to drive the one of the first telescoping rod and the second telescoping rod in an upward direction to displace the headrest to the headrest extended position.

In another aspect of the present disclosure, the drive gear defines one of a worm gear and a helical gear.

In another aspect of the present disclosure, the one of the first telescoping rod and the second telescoping rod includes a rod diameter which is smaller than an inner diameter of the housing wherein the one of the first telescoping rod and the second telescoping rod slides into and out of the housing during operation of the motor.

According to several aspects, a method for performing a vehicle headrest height adjustment comprises: telescopically mounting a headrest from a seat back of a vehicle passenger seat having a seat base rotatably connected to the seat back; generating a signal using a sensing device identifying if the vehicle passenger seat is unoccupied by an occupant; connecting a first telescoping rod and a second telescoping rod to the headrest allowing the headrest to slidably move between a headrest extended position and a headrest retracted position; mounting a headrest displacement mechanism to the headrest and one of the first telescoping rod and the second telescoping rod; and automatically lowering the headrest to the headrest retracted position by operating the headrest displacement mechanism when the signal is received from the sensing device that the vehicle passenger seat is unoccupied by the occupant.

In another aspect of the present disclosure, the method further includes: initially lowering the headrest of the vehicle occupant seat to the headrest retracted position before the vehicle occupant seat is occupied; and issuing a motor operation command when a presence of an occupant on the vehicle passenger seat is identified to initiate operation of a motor to automatically move the headrest from the headrest retracted position up to the headrest extended position.

In another aspect of the present disclosure, the method further includes: conducting a confirmation step following the motor operation command to identify if the headrest is positioned at a predetermined configuration; and holding the headrest at the predetermined configuration for one minute without conducting further sensing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
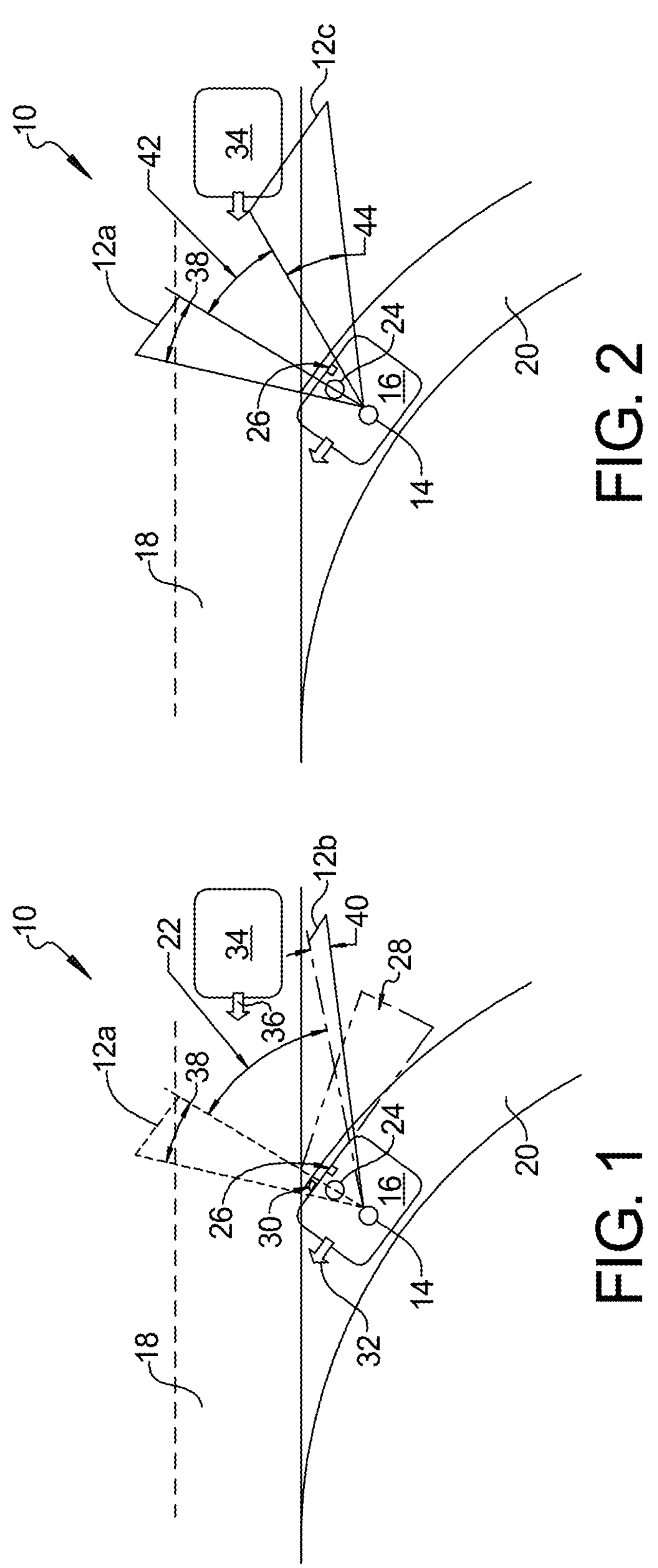
FIG. 1 is a plan view of a highway entrance interchange for a vehicle having a headrest height adjustment system according to an exemplary aspect.
FIG. 2 is a plan view of the highway entrance interchange of FIG. 1 during operation of the headrest height adjustment system.

Referring to FIG. 1, a headrest height adjustment system 10 is provided for improving a sight zone having a first sight zone portion 12*a* and a second sight zone portion 12*b* of a vehicle operator 14 as the vehicle operator 14 operates a first vehicle 16 entering a vehicle travel lane 18 from an entrance lane 20. A blocked visibility zone 22 exists in the present example which is created by a combination of a headrest 24 of a vehicle passenger seat and a B-pillar 26 of the vehicle 16 as the vehicle operator 14 attempts to view traffic in the vehicle travel lane 18. An outside right hand rearview mirror visibility zone 28 of a right-side rearview mirror 30 is not available to assist the vehicle operator 14 in viewing the vehicle travel lane 18 due to the orientation of the vehicle 16 as the vehicle 16 travels in a lane entrance direction 32.

At this time a second vehicle 34 is moving in a travel direction 36 within the vehicle travel lane 18 and is not visible to the vehicle operator 14, as the second vehicle 34 is within the blocked-visibility zone 22. The available visibility of the vehicle operator 14 is limited to a first angular range 38 of the first sight zone portion 12*a* and a second angular range 40 of the second sight zone portion 12*b*.

Referring to FIG. 2 and again to FIG. 1, the headrest height adjustment system 10 provides for visibility of the second vehicle 34 by the vehicle operator 14 by either automatically lowering the headrest 24 or operating a switch to lower the headrest 24. Lowering the headrest 24 decreases the blocked-visibility zone 22 to a limited visibility zone 42, smaller than the blocked-visibility zone 22. Lowering the headrest 24 also increases an operator visible range from the limited second sight zone portion 12*b* having the second angular range 40 to a third sight zone portion 12*c* by providing a third angular range 44 larger than the second angular range 40 and including visibility of the second vehicle 34 to the vehicle operator 14.

Referring to FIG. 3 and again to FIGS. 1 and 2, a passenger seat 46 within the first vehicle 16 and an operator seat 48 are positioned in a side-by-side configuration. The passenger seat 46 and the operator seat 48 are mounted on structural frames such as a first structural frame 50 allowing front-back motion of the seats. The vehicle seats are similar, therefore the following discussion of the passenger seat 46 applies equally to the operator seat 48. The passenger seat 46 includes a seat base 52 and a seat back 54 rotatably connected to the seat base 52. A headrest 56 supported to the seat back by a first telescoping rod 58 and a second telescoping rod 60 allow the headrest 56 to be raised or lowered, with a headrest raised position shown in FIG. 3. To maximize an amount the headrest 56 may be lowered from the headrest raised position, a headrest cavity 62 is provided recessed into an upper portion of the seat back 54, which is described in greater detail in reference to FIG. 6. A passenger defining an occupant 64 is shown seated in the passenger seat 46, at which time the headrest 56 is extended upwardly to a comfort position selected by the occupant 64.

Figure 3:
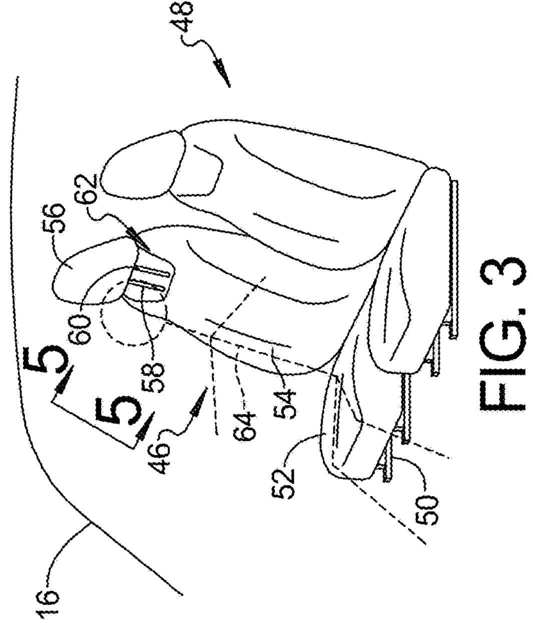
FIG. 3 is a front left perspective view of a vehicle front row seating arrangement using the headrest height adjustment system of the present disclosure.

Referring to FIG. 4 and again to FIG. 3, the headrest 56 includes a compressible inner material layer 66 such as a polymeric foam. The first telescoping rod 58 and the second telescoping rod 60 are similarly configured, therefore the following discussion of the second telescoping rod 60 applies equally to the first telescoping rod 58. The second telescoping rod 60 may include a headrest engagement portion 68 fixed in a sleeve 70 which is captured in the compressible inner material layer 66. According to several aspects, a bend 72 may be incorporated between a straight portion 74 of the second telescoping rod 60 and the headrest engagement portion 68 to orient the headrest 56 at a predetermined angle with respect to the seat back 54.

Figure 4:
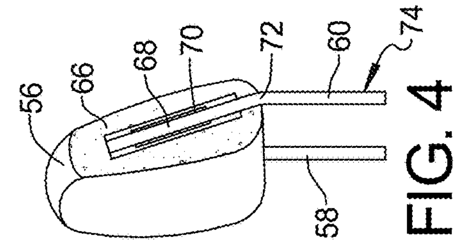
FIG. 4 is a partial cross sectional perspective view of a headrest of the present disclosure in a headrest extended position.

Referring to FIG. 5 and again to FIGS. 3 and 4, according to several aspects, the headrest 56 may be displaced to the headrest raised position by operation of a motor 76 provided individually to each of the first telescoping rod 58 and the second telescoping rod 60, therefore the following discussion of displacement of the second telescoping rod 60 applies equally to the first telescoping rod 58. The motor 76 is positioned in a housing 78 which is fixed within an upper portion of the seat back 54. A shaft 80 is connected to and axially rotated by operation of the motor 76. The shaft 80 extends into a tubular cavity 82 of the second telescoping rod 60. According to several aspects, the second telescoping rod 60 has a rod diameter 84 which is smaller than an inner diameter 86 of the housing 78 so that the second telescoping rod 60 can slide into and out of the housing 78 during operation of the motor 76.

An inner wall of the second telescoping rod 60 includes a threaded portion 88 facing into the tubular cavity 82 of the second telescoping rod 60. A drive gear 90 such as a worm gear or a helical gear is fixed on the shaft 80 and threadingly engages the threaded portion 88. The shaft 80 passes through a shaft sleeve 92 which is mounted to a surface 94 of the seat back 54 to retain a position and an orientation of the shaft 80 while supporting axial rotation of the shaft 80. Operation of the motor 76 in a first operation rotates the shaft 80 and thereby the drive gear 90 which engages with the threaded portion 88 to drive the second telescoping rod 60 in an upward direction 96 to displace the headrest 56 to the headrest extended position shown in FIG. 3.

Referring to FIG. 6 and again to FIGS. 3 through 5, the headrest height adjustment system 10 promotes automatic operation of the motor 76 described above in reference to FIG. 5 to drive the headrest 56 in a downward direction 98 to displace the headrest 56 to a headrest retracted position. In the headrest retracted position the headrest 56 fully lowers into the headrest cavity 62 created in the seat back 54. Automatic operation of the motor 76 may be initiated using a signal received from an occupant weight sensor unit 100 which indicates presence and absence of the occupant 64 shown in FIG. 3. When the occupant 64 is not sensed, a signal is sent to the motor 76 to lower the headrest 56 to the headrest retracted position. Operation of the motor 76 in a second operation rotates the shaft 80 and thereby the drive gear 90 which engages with the threaded portion 88 to drive the second telescoping rod 60 in the downward direction 98 to displace the headrest 56 to the headrest extended position shown in FIG. 3. Additional occupant sensing devices and systems may be used to initiate actuation of the motor 76. These may include but are not limited to an in-vehicle camera 102 used to identify the presence or absence of the occupant 64, and a seatbelt latched sensor 104 indicating the occupant 64 is not present due to an un-latched condition of a passenger seatbelt 106.

Referring to FIG. 7 and again to FIGS. 3 through 6, the headrest 56 is positioned at the headrest retracted position after motion in the downward direction 98. At the headrest retracted position the drive gear 90 is positioned proximate to an upper end of the second telescoping rod 60 and provides frictional resistance to a change in the elevation of the headrest 56.

Figure 6:
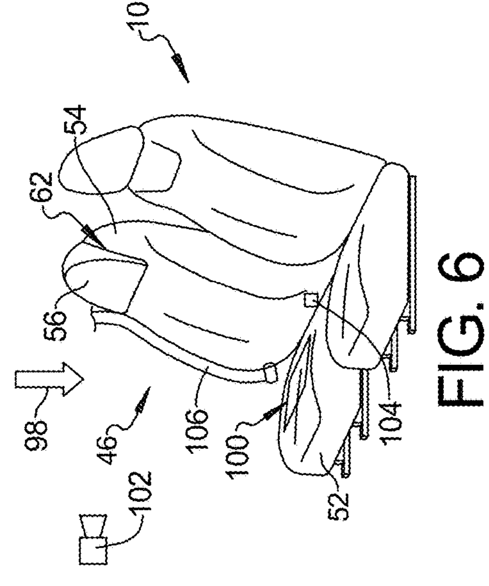
FIG. 6 is a front left perspective view modified from FIG. 4.
Figure 8:
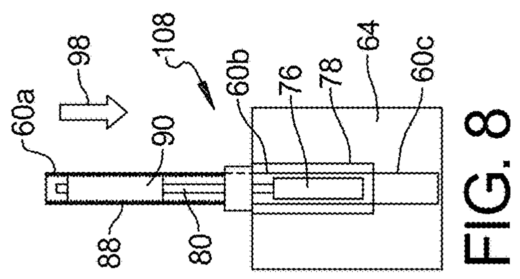
FIG. 8 is a cross sectional side elevational view modified from FIG. 5 to show the headrest retracted position.
Figure 7:
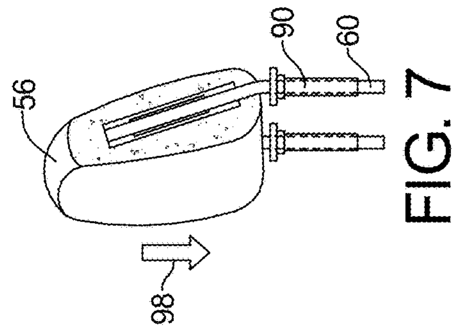
FIG. 7 is a partial cross sectional perspective view of the headrest of FIG. 4 in a headrest retracted position.
Figure 5:
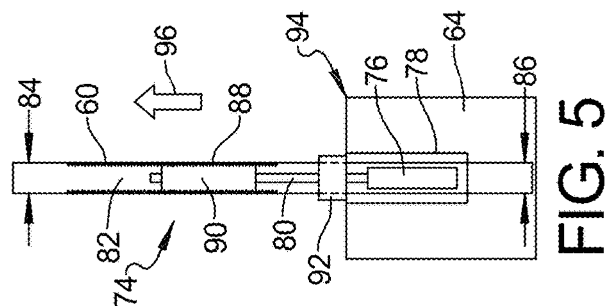
FIG. 5 is a cross sectional side elevational view taken at section 5 of FIG. 3.

Referring to FIG. 8 and again to FIGS. 5 and 7, to reach the headrest retracted position the motor 76 is automatically operated using a signal from one of the sensing systems and devices discussed in reference to FIG. 6 when confirmation is received that there is no occupant 64 in the passenger seat 46. The drive gear 90 is positioned in an upper segment **60*a* of the second telescoping rod 60. A middle segment 60*b* of the second telescoping rod 60 is positioned within the housing 78. A lower segment 60*c* of the second telescoping rod 60 has passed through the housing 78 in the downward direction 98 and reaches a position below the housing 78 and partially within the seat back 54. Together the components including the motor 76, the housing 78, the threaded portion 88, the drive gear 90 and the shaft sleeve 92 define a headrest displacement mechanism 108. According to several aspects a first headrest displacement mechanism 108 is provided for the Referring to FIG. 9 and again to FIG. 3, according to several aspects, a modified passenger seat 110 includes a geometric headrest 112 modified from the headrest 56 to incorporate a concave portion 114 which mimics and is oppositely facing a convex-shape seat back portion 116. The geometric headrest 112 is shown in a headrest raised position after movement in an upward extension direction 118. The concave portion 114 permits the geometric headrest 112 to conformingly seat against the convex-shape seat back portion 116 when downwardly displaced as shown in reference to FIG. 10. A seat base 120 may also include the occupant weight sensor unit 100 shown and described in reference to FIG. 6 producing a signal which indicates presence of the occupant 64 or lack of a signal indicating absence of the occupant 64 shown and described in reference to FIG. 3**.

Figures 9, 10, 11:
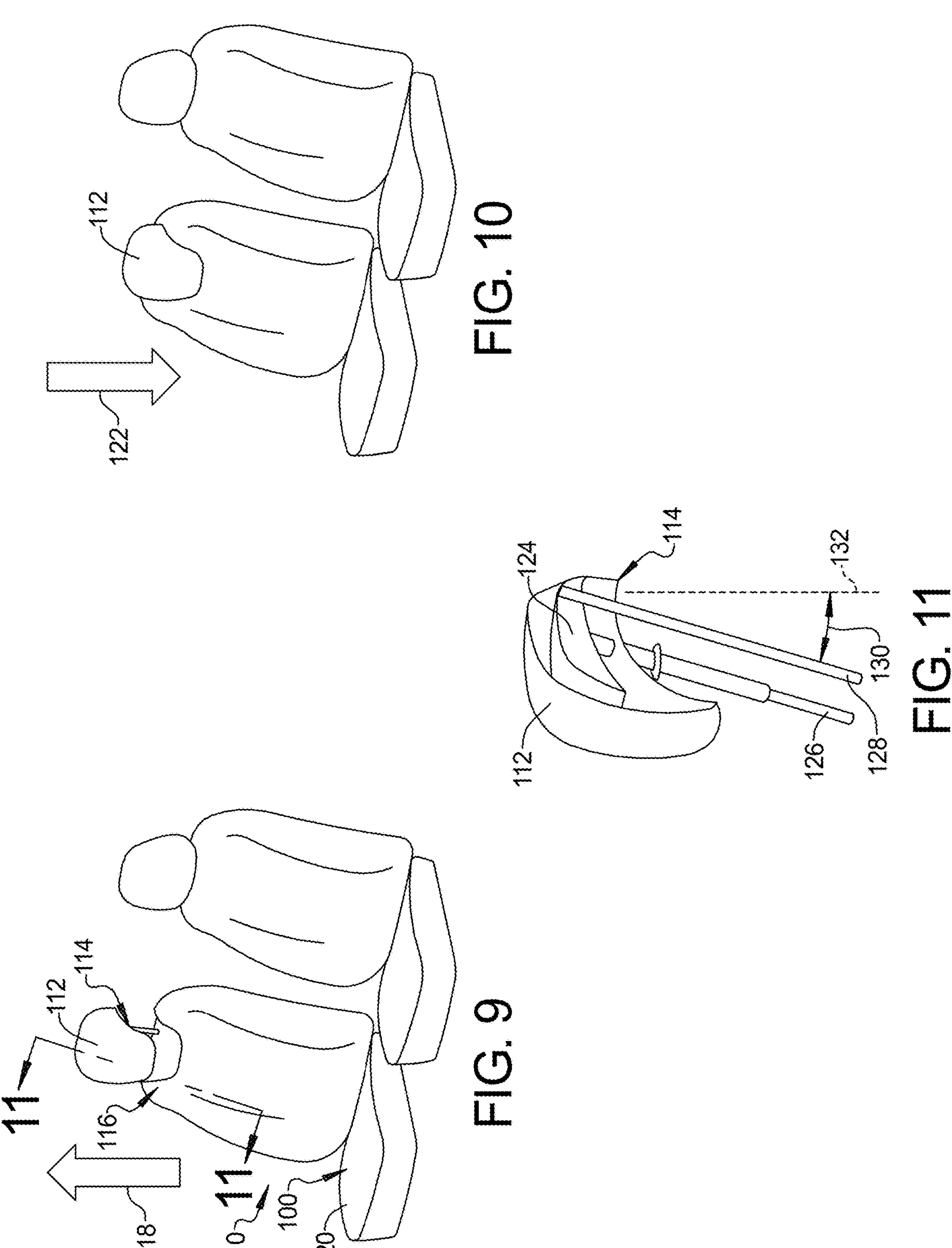
FIG. 9 is a front left perspective view of a vehicle front row seating arrangement having a modified headrest geometry.
FIG. 10 is a front left perspective view modified from FIG. 9 to shown the headrest in a headrest retracted position.
FIG. 11 is a cross sectional side elevational view taken at section 11 of FIG. 9

Referring to FIG. 10 and again to FIG. 9, the geometric headrest 112 may be retracted in a downward direction 122 to a headrest retracted position shown. In the headrest retracted position, the geometric headrest 112 presents a minimum cross section potentially blocking a view of the vehicle operator 14 shown and described in reference to FIGS. 1 and 2.

Referring to FIG. 11 and again to FIGS. 9 and 10, the geometric headrest 112 may be provided with an attachment device 124 that is positioned within the geometric headrest 112. The geometric headrest 112 is supported by a first telescoping rod 126 and a second telescoping rod 128 allow the headrest 56 to be raised or lowered. According to several aspects, to maximize the ability to fully seat the geometric headrest against the seat back 116 described in reference to FIG. 9, the first telescoping rod 126 and the second telescoping rod 128 are oriented at an angle 130 with respect to a vertical plane 132. The angle 130 is predetermined to fully seat the concave portion 114 which mimics and is oppositely facing with respect to the convex-shape seat back portion 116 described in reference to FIGS. 9 and 10.

Referring to FIG. 12 and again to FIG. 2, a rear passenger seat 134 of the vehicle 18 is positioned behind the passenger seat 46. A rear seat occupant 136 has a visibility line-of-sight 138 to a vehicle windshield 140 blocked by the headrest 56 which is in a headrest raised position.

Figures 12, 13:
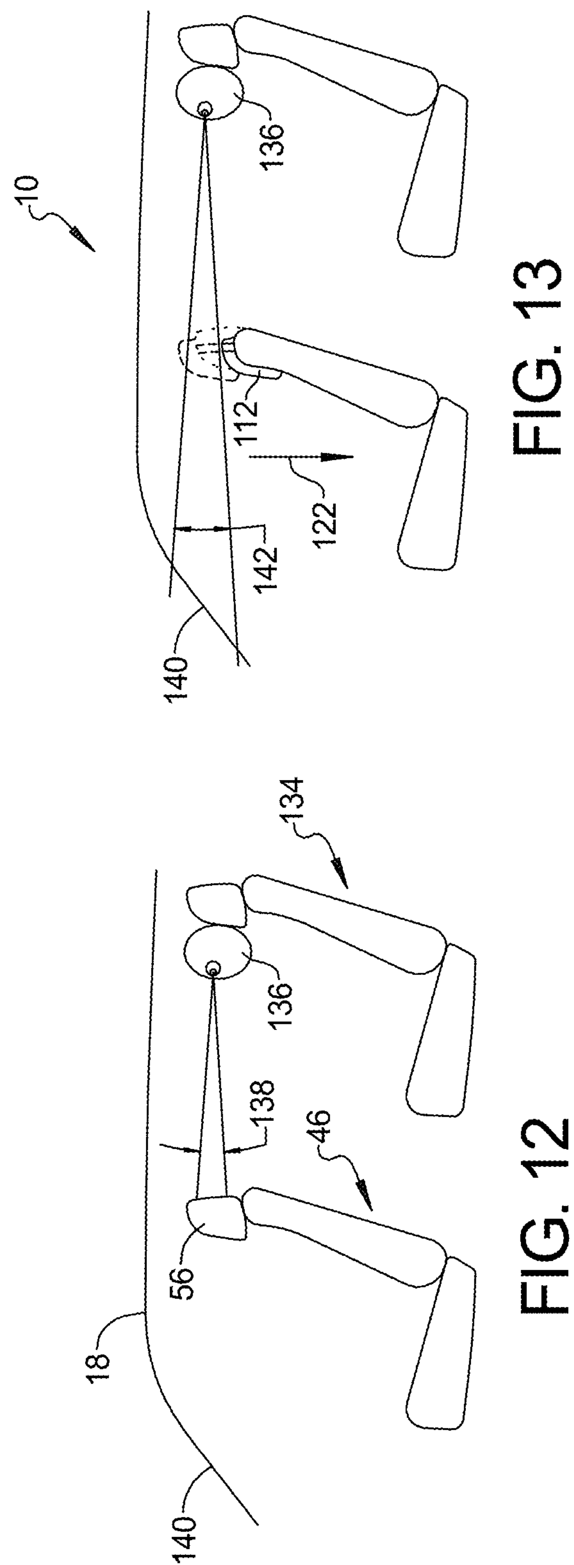
FIG. 12 is a side elevational view of a vehicle front and rear seat configuration.
FIG. 13 is the side elevational view of FIG. 12 modified during operation of the headrest height adjustment system of the present disclosure.

Referring to FIG. 13 and again to FIG. 12, the geometric headrest 112 is substituted for the headrest 56. When there is no occupant seated in the passenger seat 46, the geometric headrest 112 is positioned in the headrest retracted position by displacement in the downward direction 122. In the geometric headrest retracted position shown, the rear seat occupant 136 has an unrestricted visibility line-of-sight 142 to the vehicle windshield 140.

Figures 14, 15:
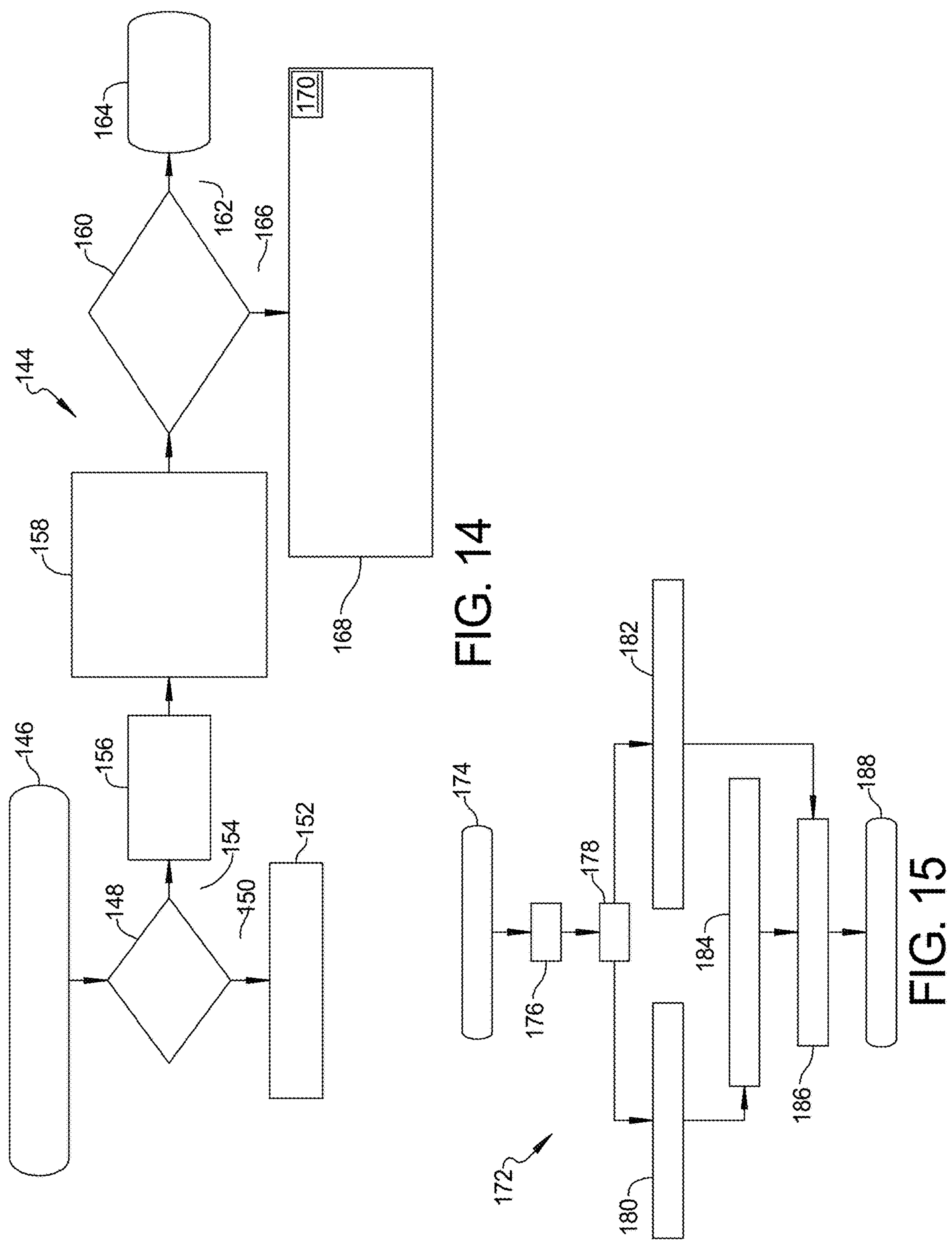
FIG. 14 is a flow diagram of the headrest height adjustment system of the present disclosure.
FIG. 15 is a flow diagram or the components of the headrest height adjustment system of the present disclosure.

Referring to FIG. 14 and again to FIGS. 1 through 13, a flow diagram 144 presents method steps for operation of the headrest height adjustment system 10. In an initiating step 146 the occupant seat headrest such as the headrest 56 is initially fully lowered at the headrest retracted position before the occupant seat 46 is occupied. In a first confirmation step 148 sensing signals such as from the occupant weight sensor unit 100 are queried to identify if the occupant 64 is seated in the passenger seat 46. If a response 150 to the first confirmation step 148 inquiry is NO, a retention decision 152 is made to keep the headrest 56 at the fully lowered position.

If a response 154 to the first confirmation step 148 inquiry is YES, a detection confirmation 156 is conducted to identify if a detection signal has been generated by the occupant weight sensor unit 100. If the detection signal has been generated by the occupant weight sensor unit 100 indicating presence of the occupant 64 a motor operation command 158 is issued to initiate operation of the motor 76 automatically move the headrest 56 from the headrest retracted position up to a headrest previous extended position predetermined by the occupant 64, or to a default headrest raised position. Following the motor operation command 158 a second confirmation step 160 is conducted to identify if the headrest 56 is positioned properly.

If a response 162 to the second confirmation step 160 is YES a final NO more action required condition 164 is reached. If a response 166 to the second confirmation step 160 is NO in an operation step 168 the occupant 64 manually operates a control switch 170 positioned for example in a door trim location proximate to the occupant 64 or at a side of the passenger seat 46 to change a position of the headrest 56. The headrest 56 position is then held for one minute without further sensing.

Referring to FIG. 15 and again to FIGS. 1 through 14, a flow diagram 172 presents component communication pathways for the headrest height adjustment system 10. An initial weight sensor communication is performed in a body control module (BCM) 176. The BCM 176 communicates with an electronic control unit (ECU) 178 which provides motor signals to a motor actuator 180 of the motor 76 and communicates with a manual adjustment switch 182 discussed above with respect to the control switch 170. The motor actuator 180 communicates with a support height sensor 184 to sense an elevation of the headrest 56. The support height sensor 184 and the manual adjusting switch 182 control a headrest height adjuster 186. After height adjustment is complete from the height adjuster 186 an adjustment finish 188 is confirmed to end the cycle.

A False Positive Detection function is provided such that if sensing by the weight sensor 100 is stopped due to movement of the occupant 64, a set headrest position is maintained for one (1) minute after sensing is stopped to prevent the set headrest position from changing.

The headrest height adjustment system 10 automatically adjusts a headrest position or elevation to enhance a vehicle operator's actions, thereby enhancing vehicle operator visibility and promoting safer driving conditions. The headrest height adjustment system 10 improves vehicle operator visibility and safety during shoulder checks.

The headrest height adjustment system 10 integrates weight sensing technology with automatic headrest height adjustment to provide optimal shoulder examination conditions for the vehicle operator. By utilizing sensors that detect a weight of the occupant when present or the presence of the occupant when seated in the passenger seat, the headrest height adjustment system 10 intelligently distinguishes between the presence of an occupant and whether the headrest needs to be lowered to improve visibility of the vehicle operator. This seamless automatic adjustment ensures the vehicle operator's field of vision remains unobstructed without the need for manual intervention.

If the weight sensor detects an occupant while the headrest is lowered and when there is an occupant in the passenger seat, the headrest is automatically adjusted to a headrest previously set height. To improve occupant comfort, a vehicle control unit (VCU) includes a control switch for the headrest, allowing occupants to customize the height of the headrest according to their preferences. Additionally, for false positive detection, the headrest maintains the set position for one (1) minute even if weight sensing is stopped due to the occupant's temporary movement.

According to several aspects, at least two lowering types of headrest may be used. The first is headrest lowering implemented using part of an existing headrest frame, having dimensions that may reduce shoulder pressure and maintain headrest function reviewed through benchmarking. The second is an L-shaped headrest which is implemented in the first seat row to improve shoulder pressure.

Utilizing a worm and pinion gear set in the headrest displacement mechanism 108 improves the reliability and stability of the lowering function. These components ensure precise and consistent adjustment and maintain the desired headrest position even under varying driving conditions or vehicle movements.

The headrest is implemented in multiple forms: including one integrated into the seat back and an L-shaped headrest and provides a device that can lower the headrest depending on whether the seat is occupied. Inside a headrest support is a gear set with a built-in motor that operates depending if an occupant is seated on the passenger seat. A weight sensor mounted on the seat detects whether an occupant is on the seat, and a signal from the weight sensor is sent to the BCM. The signal is also transmitted to the ECU to initiate operation of a motor actuator. The motor is connected to a worm gear, so the adjusted headrest position can be maintained without a separate stopper using friction generated by the worm gear. A False Positive Detection function is provided wherein if the sensed signal output from the weight sensor is stopped due to a movement of the occupant, the set headrest position is maintained for one (1) minute after sensing is stopped to prevent the set headrest position from changing. The motor operates according to the value of the signal generated by the sensor which is transmitted to the BCM, and appropriate headrest lowering can be determined depending on the presence or absence of an occupant through the BCM. Regardless of the value of the signal or the presence of the signal, the headrest can be operated manually via a vehicle control unit (VCU) using a manual switch.

What is claimed is:

1. A vehicle headrest height adjustment system, comprising:

- a vehicle seat having a seat back, a seat base and a headrest;
- a sensing device generating a signal when the vehicle seat is unoccupied by an occupant; and
- a headrest displacement mechanism connected to the headrest and reversibly displacing the headrest between a headrest extended position and a headrest retracted position, the headrest displacement mechanism lowering the headrest to the headrest retracted position when the signal is received from the sensing device that the vehicle seat is unoccupied by the occupant, wherein the headrest displacement mechanism includes a motor positioned within a housing located within the seat back, and at least one telescoping rod supports the headrest to the seat back and is connected to the motor thereby permitting telescoping motion of the headrest by operation of the motor, and wherein the headrest displacement mechanism includes:

a threaded portion of the at least one telescoping rod;

a shaft sleeve extending from the motor into the at least one telescoping rod; and a drive gear connected to the shaft sleeve engaging the threaded portion wherein operation of the motor rotates the drive gear and thereby the threaded portion initiates telescoping motion of the headrest.

2. The vehicle headrest height adjustment system of claim 1, wherein the sensing device defines a weight sensor supported by the seat base.

3. The vehicle headrest height adjustment system of claim 1, wherein the sensing device defines a camera.

4. The vehicle headrest height adjustment system of claim 1, wherein the sensing device defines a seatbelt latched sensor indicating the occupant is not present due to an un-latched condition of a passenger seatbelt.

5. The vehicle headrest height adjustment system of claim 1, further including a manual adjustment switch positioned proximate to the occupant and configured to be manually actuated by the occupant to change a position of the headrest.

6. The vehicle headrest height adjustment system of claim 1, wherein the headrest includes a concave portion which mimics and is oppositely facing with respect to a portion of the seat back having a convex-shape.

7. A headrest height adjustment system, comprising:

a vehicle seat having a seat base, a seat back rotatably connected to the seat back and a headrest telescoping from the seat back;

a sensing device generating a signal if the vehicle seat is unoccupied by an occupant;

a first telescoping rod and a second telescoping rod connected to the headrest allowing the headrest to slidably move between a headrest extended position and a headrest retracted position;

a headrest displacement mechanism connected to the headrest and one of the first telescoping rod and the second telescoping rod, the headrest displacement mechanism automatically lowering the headrest to the headrest retracted position when the signal is received from the sensing device that the vehicle seat is unoccupied by the occupant defined when the occupant is not present, wherein the headrest displacement mechanism includes a motor, the motor being positioned in a housing which is fixed within the seat back;

a shaft connected to and axially rotated by operation of the motor, the shaft extending into a tubular cavity of one of the first telescoping rod and the second telescoping rod;

an inner wall of the one of the first telescoping rod and the second telescoping rod including a threaded portion facing into the tubular cavity; and a drive gear fixed on the shaft and threadingly engaging the threaded portion.

8. The headrest height adjustment system of claim 7, including a shaft sleeve mounted to a surface of the seat back, the shaft passing through the shaft sleeve to retain a position and an orientation of the shaft while supporting axial rotation of the shaft.

9. The headrest height adjustment system of claim 7, wherein operation of the motor in a first operation rotates the shaft and thereby the drive gear which engages with the threaded portion to drive the one of the first telescoping rod and the second telescoping rod in an upward direction to displace the headrest to the headrest extended position.

10. The headrest height adjustment system of claim 7, wherein the drive gear defines one of a worm gear and a helical gear.

11. The headrest height adjustment system of claim 7, wherein the one of the first telescoping rod and the second telescoping rod includes a rod diameter which is smaller than an inner diameter of the housing, wherein the one of the first telescoping rod and the second telescoping rod slides into and out of the housing during operation of the motor.

* * * * *